United States Patent [19]

Katagiri et al.

[11] 3,865,799

[45] Feb. 11, 1975

[54] SINTERED PLATE OF POLYVINYL CHLORIDE RESIN AND METHOD OF MAKING THE SAME

[75] Inventors: Kotaro Katagiri, Tokyo; Yoshio Nakamura, Saitama-ken; both of Japan

[73] Assignee: Shinetsu Chemical Company, Tokyo, Japan

[22] Filed: Aug. 21, 1972

[21] Appl. No.: 282,353

Related U.S. Application Data

[63] Continuation of Ser. No. 63,148, Aug. 12, 1970, abandoned.

[30] Foreign Application Priority Data

Aug. 26, 1969 Japan.............................. 44-67483

[52] U.S. Cl.......... 260/92.8 A, 260/2.5 M, 202/239
[51] Int. Cl............................. C08f 1/88, C08f 3/30
[58] Field of Search................... 260/2.5 M, 92.8 A

[56] References Cited

UNITED STATES PATENTS

| | | | |
|---|---|---|---|
| 2,960,727 | 11/1960 | Bradshaw................................. | 18/55 |
| 2,963,746 | 12/1960 | Webb et al. ............................. | 18/57 |
| 2,984,869 | 5/1961 | Honey et al. ............................ | 18/48 |
| 3,117,113 | 1/1964 | Tudor................................. | 260/92.8 |
| 3,654,065 | 4/1972 | Dorogi................................ | 161/159 |

Primary Examiner—Joseph L. Schofer
Assistant Examiner—John Kight, III
Attorney, Agent, or Firm—Toren and McGeady

[57] ABSTRACT

A plate, prepared by sintering a mixture of 100 parts by weight of polyvinyl chloride resin and from 0.1 to 10 parts by weight of a surface active agent, which has a tensile strength of at least 0.7 kg/mm$^2$, has very high wettability and permeability for water, and resistance to combustion. Among other uses, the plate may serve in packings for cooling towers due to these excellent properties mentioned. The invention also relates to a method of making the plate.

3 Claims, 2 Drawing Figures

FIG. 1
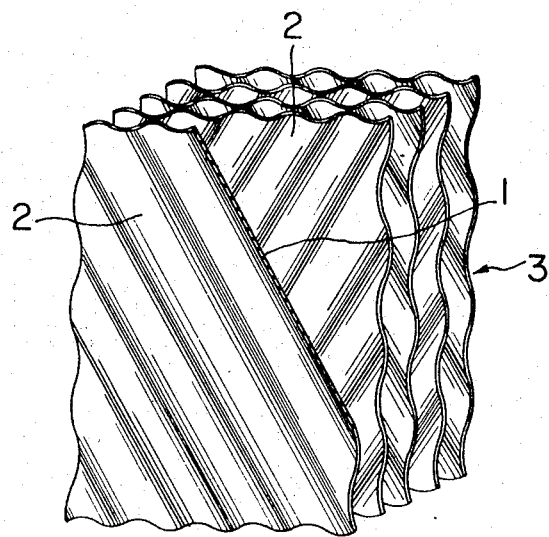
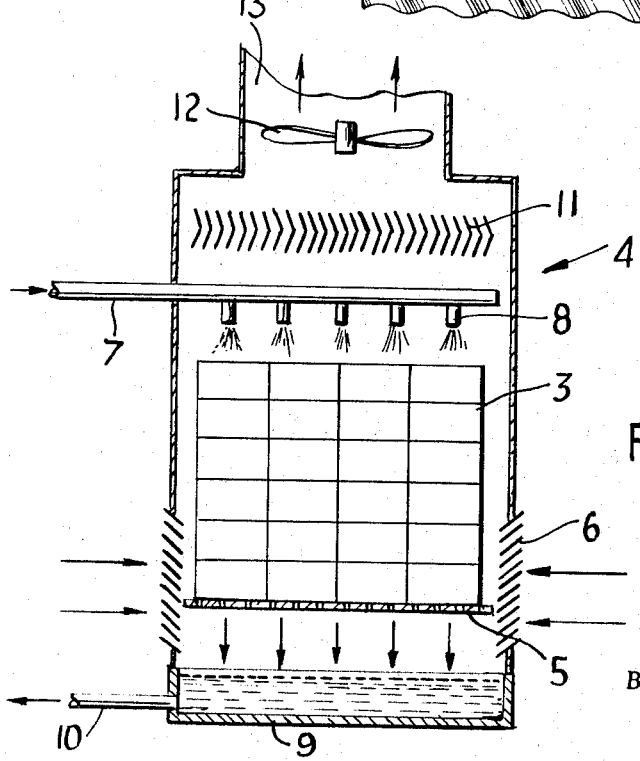
FIG. 2
INVENTORS
KOTARO KATAGIRI
YOSHIO NAKAMURA

SINTERED PLATE OF POLYVINYL CHLORIDE RESIN AND METHOD OF MAKING THE SAME

This is a continuation of application Ser. No. 63,148 filed Aug. 12, 1970, and now abandoned.

SUMMARY OF THE INVENTION

This invention relates to a sintered plate comprising a base of polyvinyl chloride resin, and as an admixture thereto, a surface active agent. The sintered plate has improved tensile strength, wettability by water and permeability thereto, and is highly resistant to combustion, properties which make the plate of the invention very useful as packing for cooling towers. The invention also relates to a method for making the plate.

Wood, bamboo, paper impregnated with synthetic resins, or sheets or plates of synthetic resins, have been used as packings for cooling towers. Of these substances, packings of wood or bamboo, which are low-priced, are apt to absorb water and get deformed and are subject to decay; moreover, they are not durable because of their combustibility, especially in winter, when only air is passed through the cooling equipment instead of water. On the other hand, packings of paper impregnated with synthetic resins are of low strength, durability and wettability, while packings of sheets or plates of synthetic resins, although much superior to others in strength and durability, have the disadvantages of hardly getting wet. Therefore, before they are put to use, they must be subjected to surface treatment, with, for example, a hydrophilic substance; this results in high processing costs. Furthermore, it is a shortcoming of the thus treated synthetic resin plates that the treated surface deteriorates in use and their characteristics decline in the long run, so that they are not capable of serving the purpose satisfactorily.

It is an object of the invention to provide a sintered plate consisting essentially of polyvinyl chloride resin which has high tensile strength, wettability by and permeability for water, and which is substantially incombustible.

It is another object of the invention to provide a sintered plate of the type mentioned which can be stacked to form a block for insertion as a packing into a cooling tower.

It is yet another object to provide a method for making the sintered plate and the block for insertion into a cooling tower.

Other objects and advantages of the invention will become apparent from the following description and the accompanying drawing.

The sintered plate of polyvinyl chloride resin of the present invention, having a tensile strength of at least 0.7 kg/mm$^2$, is prepared by sintering a mixture of 100 parts by weight of polyvinyl chloride resin and from 0.1 to 10 parts by weight of surface active agent. As the plate contains a surface active agent and its structure is porous, its wettability by water is higher than that of the materials used heretofore. Furthermore, as water gets diffused in the sintered plate or toward its surface by capillarity, a packing can be made by processing this sintered plate which has a cooling capacity over its entire surface, achieving a remarkable cooling effect. In addition, the sintered plate of this invention possesses thermal plasticity, so that it can be easily processed into any desired shape. It is low in bulk density, as low as from 50 to 80% of that of a sheet or plate of polyvinyl chloride resin hitherto employed, so that it lends itself to the use of insert into cooling towers, in which a number of such plates are to be packed and which can be made small in size and light in weight. As the sintered plate of the invention has a tensile strength of at least 0.7 kg/mm$^2$, it comes up to the standard requirements of a packing for a cooling tower both in strength and durability.

In the following a more detailed description of the plate according to the invention will be given. The plate of polyvinyl chloride resin of this invention is prepared by sintering polyvinyl chloride resin, having a particle size of at least 90% by weight in the range of from 10 to 150 $\mu$ and containing a prescribed amount of surface active agent. If the polyvinyl chloride resin is of substantially larger particle size, no sintered plate of uniformly porous structure and high tensile strength, will be obtained. If, on the other hand, the polyvinyl chloride resin is of considerably smaller particle size, the porosity of the plate will decrease, thereby lowering the water-retention capacity of the plate, resulting in a plate of low cooling effect.

As mentioned above, the surface active agent contained in the polyvinyl chloride resin is considered to be essential to the improvement of the water-wettability of the plate and the quantity of the surface active agent has to be in the range of from 0.1 to 10 parts by weight based on 100 parts by weight of polyvinyl chloride resin. If the polyvinyl chloride resin has been prepared by the ordinary suspension polymerization method, an amount of surface active agent in the range mentioned above may be added to and mixed with the polyvinyl chloride resin, but if the polyvinyl chloride resin has been prepared by emulsion polymerization and already contains some surface active agent, such an amount of surface active agent which gives the final content of from 0.1 to 10 parts by weight should be added to and mixed with 100 parts of the polyvinyl chloride resin. The degree of polymerization of the polyvinyl chloride resin does not influence the properties of the sintered plate to a considerable extent, but polyvinyl chloride resin of from 700 to 1,500 polymerization degrees should be preferably used.

Any surface active agent may be added to and mixed with the polyvinyl chloride resin, as long as it serves to improve the water-wettability of the sintered plate; it may be selected from the group consisting of nonionic surface active agents, such as polyoxyethylene alkyl ether, polyoxyethylene alkyl ester, and block copolymer of polyoxyethylene and polyoxypropylene; of anionic surface active agents, such as alkyl aryl sulfonate, alkyl sulfonate, alkyl sulfate, alkyl ether sulfate, and sulfosuccinic acid ester; and of cationic surface active agents, such as higher amine salt of a halogen acid, halogenated alkyl pyridinium, polyoxyethylene alkyl amine, polyoxyethylene alkyl amide, and quaternary ammonium salt.

The method of preparing the sintered plate of this invention, having a tensile strength of at least 0.7 kg/mm$^2$, comprises spreading polyvinyl chloride resin of a particle size as indicated and containing some of the above-mentioned surface active agents, for example, on a metal plate, and scraping it or compressing it lightly with a roller, into a plate, 0.3–1.0 mm in thickness; the plate is then heated at a temperature between 180° and 300° C for a period of from 1 to 30 minutes, and cut into the desired size.

The sintered plate can be used as a packing for a cooling tower, as it is, or, if necessary, after heated above its softening point or, preferably at a temperature between 60° and 150° C so that it may be molded into a desired shape or pattern, such as a corrugated, wrinkled, dimpled, embossed or punched plate. A number of such sintered plates are stacked in layers so that they will form a block, which is placed in the cooling tower to be employed as packing.

IN THE DRAWINGS:

FIG. 1 is a block sintered plate, and
FIG. 2 is a longitudinal section of a cooling tower.

Referring now to the drawings, FIG. 1 shows by way of example, a block sintered plate capable of being packed into a cooling tower. In the figure, 1 is a corrugated sintered plate with a number of grooves 2 on it, which is so placed that the grooves of the adjacent plate are in opposite direction. A number of such plates arranged in layers form a packing 3 to be inserted in the cooling tower.

The details of the present invention will be further described in the following examples, in which polyvinyl chloride resins employed as raw materials are of the different kinds, designated as A, B and C; all parts are by weight.

Resin A: To 100 parts of polyvinyl chloride resin prepared by suspension polymerization, 90% by weight of which had a particle size of from 10 to 150 $\mu$ while the balance had a particle size of less than 10 $\mu$, and whose average polymerization degree and bulk density were 830 and 0.48, respectively, we added a mixture of 5 parts of dioctyl sodium sulfosuccinate and 5 parts of water-ethanol solution 1:1; after having been well mixed, the mixture was dried at room temperature.

Resin B: A mixture was prepared by adding 3 parts of sodium tridecyl sulfate to 100 parts of polyvinyl chloride resin prepared by suspension polymerization and having an average polymerization degree of 810, a bulk density of 0.43 and a particle size distribution of from 10 to 100 $\mu$.

Resin C: This was a polyvinyl chloride resin prepared by emulsion polymerization, having an average polymerization degree of 1,070, a bulk density of 0.56, and a particle size of from 10 to 150 $\mu$, and containing 1% of a surface active agent, sodium lauryl ether sulfate, added at the time of polymerization to act as an emulsifier.

EXAMPLE 1

Resins A, B and C were each spread about 1 mm thick on an iron plate, and then heated in a sintering furnace under the conditions given in Table 1, whereby sintered plates were obtained with physical properties also indicated in Table 1.

The sintered plates, A, B, and C were processed into corrugated plates with a pitch of 30 mm and a height of 15 mm, and 20 sheets of each kind were stacked, one on top of the other, in such a way that the grooves on the adjoining plates would cross each other at an angle of 60° C, until a block, 600 mm long, 200 mm wide and 300 mm thick, was obtained to be used as packing; (Samples X, Y and Z) given in Table 2.

24 samples were prepared of each kind, and they were placed in a cooling tower, as illustrated in FIG. 2, on a supporting member 5. The packing density was 90 $m^2/m^3$. Air was then introduced into the cooling tower through louvers 6, provided on the lower portion of the tower housing, while water was introduced through a pipe 7 and sprayed over packings 3 by means of sprinklers 8. The spraying was effected so that air and water came into contact with each other in the packing. The water descending through the packings was collected in a tank 9, provided at the bottom of the cooling tower, and then discharged from the cooling tower through a pipe 10. The air ascending through the packings and passing an eliminator 11 was discharged from the cooling tower through an exit 13, by means of a fan 12.

The cooling capacity of the cooling tower was tested by passing air through it at the rate of $10 \times 10^3$ $kg/m^2 \cdot hr$, and also by passing water therethrough at a different rate and determining the ratio of water to air.

The results obtained are given in Table 2 as relations between the volume coefficient, $Q$, of the cooling tower and the flow ratio of water to air, $L/G$. In the table, Sample S represents packings prepared of commercial polyvinyl chloride resin sheets, having the same surface area and permeability resistance as the packings of the present invention. Sample S was tested as a control.

The volume coefficient of the cooling tower was calculated by means of the following equation:

$$Q = KaV/L$$

where $K$ is an over-all heat transfer coefficient based on the enthalpy difference, $a$ is the contact area per unit volume, $V$ is the volume of packing and $L$ the flow of water.

Table 2

| Sample | Volume coefficient of cooling tower (Q) | | | |
|---|---|---|---|---|
| L/G | X | Y | Z | S |
| 0.6 | 0.74 | 0.88 | 0.80 | 0.47 |
| 1.0 | 0.63 | 0.70 | 0.66 | 0.39 |
| 1.5 | 0.46 | 0.52 | 0.50 | 0.30 |
| 2.0 | 0.36 | 0.42 | 0.39 | 0.25 |
| 3.0 | 0.25 | 0.28 | 0.26 | 0.18 |

As may be seen from the table, the samples of the present invention showed a remarkably improved cool- Table 1

| | | Sintered plate | | |
|---|---|---|---|---|
| | | A | B | C |
| Sintering condition (°C/min.) | | 210/5 | 200/9 | 220/6 |
| | (Tensile strength (kg/mm²)) | 0.8 | 1.2 | 1.8 |
| Physical properties | (Spread of water (mm²) (Note 1)) | 292 | 346 | 321 |
| | (Height of water (mm) (Note 2)) | 65 | 80 | 73 | ing capacity when L/G was in the range of from 1 to 2 which is an ordinary working condition for a cooling tower. Therefore, if the sintered plates are employed as packings for a cooling tower, the size of the cooling tower can be made smaller, thus affording a great economical advantage.

EXAMPLE 2

Various sintered plates were made of Resin A by the methods given in Example 1, and the tensile strength and the cracking angle of each of them were measured, whereby the results shown in Table 3 were obtained. When the value of the tensile strength was below 0.7 kg/mm$^2$, the cracking angle was suddenly reduced. Packings having such physical properties were found to be unsuitable for use in a cooling tower.

The cracking angle was measured by bending each sample 15 mm × 10 mm × 0.5 mm in size at the rate of 1°/sec. and the angle at which a crack appeared is considered as the cracking angle.

Table 3

| Tensile strength in kg/mm$^2$ | 0.1 | 0.4 | 0.7 | 1.0 | 1.3 | 1.6 |
|---|---|---|---|---|---|---|
| Cracking angle | 19 | 22 | 26 | 32 | 41 | 55 |

As may be seen from this Table the cracking angle was considerably higher when the tensile strength was above 0.7 kg/mm$^2$.

What is claimed is:

1. A sintered porous plate for use as packing in a cooling tower, said plate being formed of polyvinyl chloride homopolymer resin having a tensile strength of at least 0.7 kg/mm$^2$, and containing a mixture of 100 parts by weight of polyvinyl chloride resin, at least 90% by weight of which has a particle size of from 10 to 150$\mu$, and from 0.1 to 10 parts by weight of one or more surface active agents.

2. A method for preparing a sintered plate as claimed in claim 1 which comprises the steps of mixing 100 parts by weight of polyvinyl chloride homopolymer resin and from 0.1 to 10 parts by weight of a surface active agent, spreading the mixture uniformly over a metal plate and thereafter heating it at a temperature of from 180° to 300° C for a period of from 1 to 30 minutes.

3. The method claimed in claim 2 wherein at least 90% by weight of the polyvinyl chloride resin has a particle size in the range of from 10 to 150 $\mu$.

* * * * *